United States Patent
Okuyama et al.

(10) Patent No.: US 12,107,514 B2
(45) Date of Patent: Oct. 1, 2024

(54) POWER CONVERSION DEVICE WITH CONTROL SIGNAL GATE SELECTION CIRCUIT

(71) Applicant: TMEIC Corporation, Chuo-ku (JP)

(72) Inventors: Ryota Okuyama, Chuo-ku (JP); Hiroki Ishitobi, Chuo-ku (JP); Takashi Sugiyama, Chuo-ku (JP)

(73) Assignee: TMEIC CORPORATION, Chuo-ku (JP)

(*) Notice: Subject to any disclaimer, the term of this patent is extended or adjusted under 35 U.S.C. 154(b) by 160 days.

(21) Appl. No.: 17/427,995

(22) PCT Filed: Oct. 10, 2019

(86) PCT No.: PCT/JP2019/040007
§ 371 (c)(1),
(2) Date: Aug. 3, 2021

(87) PCT Pub. No.: WO2021/070323
PCT Pub. Date: Apr. 15, 2021

(65) Prior Publication Data
US 2022/0123668 A1    Apr. 21, 2022

(51) Int. Cl.
*H02M 7/483* (2007.01)
*H02M 1/08* (2006.01)
*H02M 1/42* (2007.01)

(52) U.S. Cl.
CPC ........... *H02M 7/4835* (2021.05); *H02M 1/08* (2013.01); *H02M 1/4216* (2013.01)

(58) Field of Classification Search
CPC .. H02M 7/483; H02M 7/4833; H02M 7/4835; H02M 1/42; H02M 1/4208; H02M 1/4233; H02M 1/08; H02M 1/007
See application file for complete search history.

(56) References Cited

U.S. PATENT DOCUMENTS

| 5,329,221 A * | 7/1994 | Schauder | G05F 1/70 323/212 |
| 2010/0277152 A1* | 11/2010 | MacFarlane | H02M 3/07 323/288 |

(Continued)

FOREIGN PATENT DOCUMENTS

WO    WO 2016/203516 A1    12/2016

OTHER PUBLICATIONS

Wiley Electrical and Electronics Engineering Dictionary, Wiley-IEEE Press, 2004, pp. 608.*

(Continued)

*Primary Examiner* — Alex Torres-Rivera
(74) *Attorney, Agent, or Firm* — Oblon, McClelland, Maier & Neustadt, L.L.P.

(57) ABSTRACT

A power conversion device includes: a first control unit and a second control unit that output a first control signal and a second control signal, respectively; a gate circuit that causes a control signal selected from the first control signal and the second control signal to pass through the gate circuit; and a drive circuit that drives a main circuit based on the control signal that passes through the gate circuit. When the second control signal is selected in the state where the first control signal passes through the gate circuit, the gate circuit interrupts the first control signal and causes the second control signal to pass through the gate circuit as an absolute value of an instantaneous value of an AC current decreases below a threshold current.

2 Claims, 10 Drawing Sheets

(56) References Cited

U.S. PATENT DOCUMENTS

| | | | |
|---|---|---|---|
| 2012/0113698 A1* | 5/2012 | Inoue | H02M 7/4835 363/123 |
| 2016/0134185 A1* | 5/2016 | Wang | G01R 19/175 324/127 |
| 2019/0097565 A1 | 3/2019 | Hayakawa | |

OTHER PUBLICATIONS

Jim Stiles, Gate Propagation Delay, Nov. 5, 2004, The Univ. of Kansas, pp. 1-2.*
Delay of Combinational Circuits, Timing Issues of Digital Circuits.*
Ivan Ratkovic, An Overview of Architecture-Level Power- and Energy-Efficient Design Techniques, 2015.*
International Search Report mailed on Dec. 17, 2019 in PCT/JP2019/040007 filed on Oct. 10, 2019 (1 page).
Extended European Search Report issued May 31, 2023, in corresponding European Patent Application No. 19948379.3, 10 pages.
Office Action issued Feb. 29, 2024, in corresponding European Patent Application No. 19 948 379.3, 6 pages.

* cited by examiner

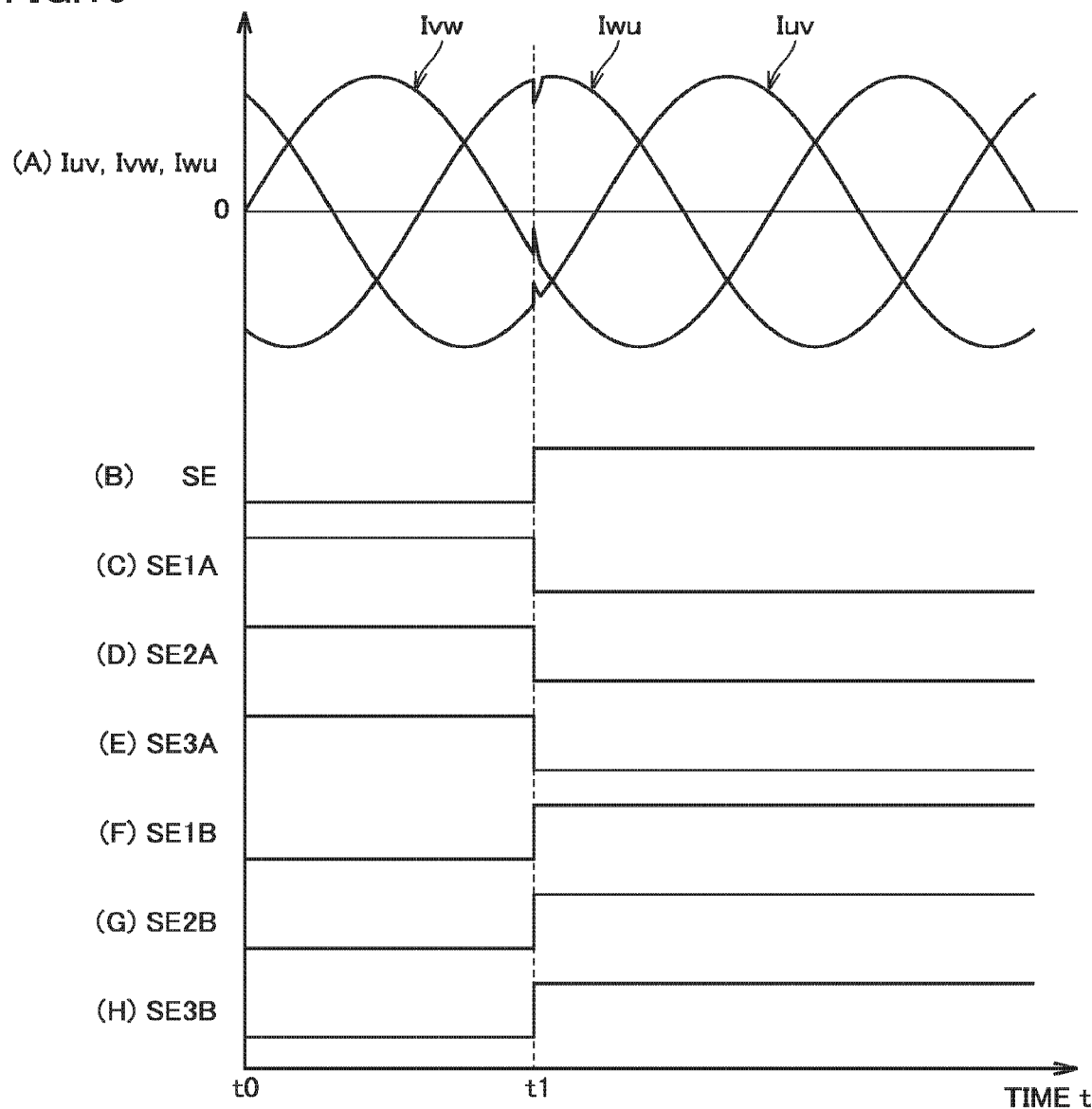

POWER CONVERSION DEVICE WITH CONTROL SIGNAL GATE SELECTION CIRCUIT

TECHNICAL FIELD

The present invention relates to a power conversion device, and more particularly to a power conversion device including a power converter that transmits and receives electric power between a capacitor and an alternating-current (AC) power supply.

BACKGROUND ART

In recent years, it has been considered to apply a modular multilevel converter (MMC) to a self-excited reactive power compensation apparatus such as a static synchronous compensator (STATCOM), a direct-current (DC) power transmission system such as a back to back (BTB) system, a motor drive inverter, and the like (for example, see WO2016/203516 (PTL 1)).

The MMC is configured with a plurality of unit converters connected in series. Each of the unit converters includes: a capacitor; a power converter that transmits and receives electric power between the capacitor and an AC power supply; and a drive circuit that drives the power converter based on a control signal supplied from a host controller that controls the entire MMC.

CITATION LIST

Patent Literature

PTL 1: WO2016/203516

SUMMARY OF INVENTION

Technical Problem

In the case where the MMC is controlled by only a single controller, the operation of the MMC needs to be stopped when maintenance of the controller is performed. As the countermeasures therefor, it is conceivable to employ a method of using two controllers for controlling an MMC by one controller while maintenance of the other controller is performed. According to this method, however, at the time of switching of a control signal, a distortion may occur in the waveform of the AC current that flows between an AC power supply and a power converter.

Thus, an object of the present invention is to provide a power conversion device by which a waveform distortion occurring in an AC current at the time of switching of a control signal can be suppressed small.

Solution to Problem

A power conversion device of the present invention includes: a capacitor; a power converter that transmits and receives electric power between the capacitor and an AC power supply; a current detector that detects an instantaneous value of an AC current that flows between the AC power supply and the power converter; a first control unit and a second control unit that output a first control signal and a second control signal, respectively; a gate circuit that causes a control signal selected from the first control signal and the second control signal to pass through the gate circuit; and a drive circuit that drives the power converter based on the control signal that passes through the gate circuit. When the second control signal is selected in a state where the first control signal passes through the gate circuit, the gate circuit interrupts the first control signal and causes the second control signal to pass through the gate circuit as an absolute value of the instantaneous value of the AC current detected by the current detector decreases below a predetermined value.

Advantageous Effects of Invention

According to the present invention, when the absolute value of the instantaneous value of the AC current decreases below the predetermined value, the control signal is switched. Thus, a waveform distortion occurring in the AC current at the time of switching of the control signal can be suppressed small.

BRIEF DESCRIPTION OF DRAWINGS

FIG. 10 shows time charts for illustrating the problem of the comparative example shown in FIG. 9.

DESCRIPTION OF EMBODIMENTS

Figure 1:
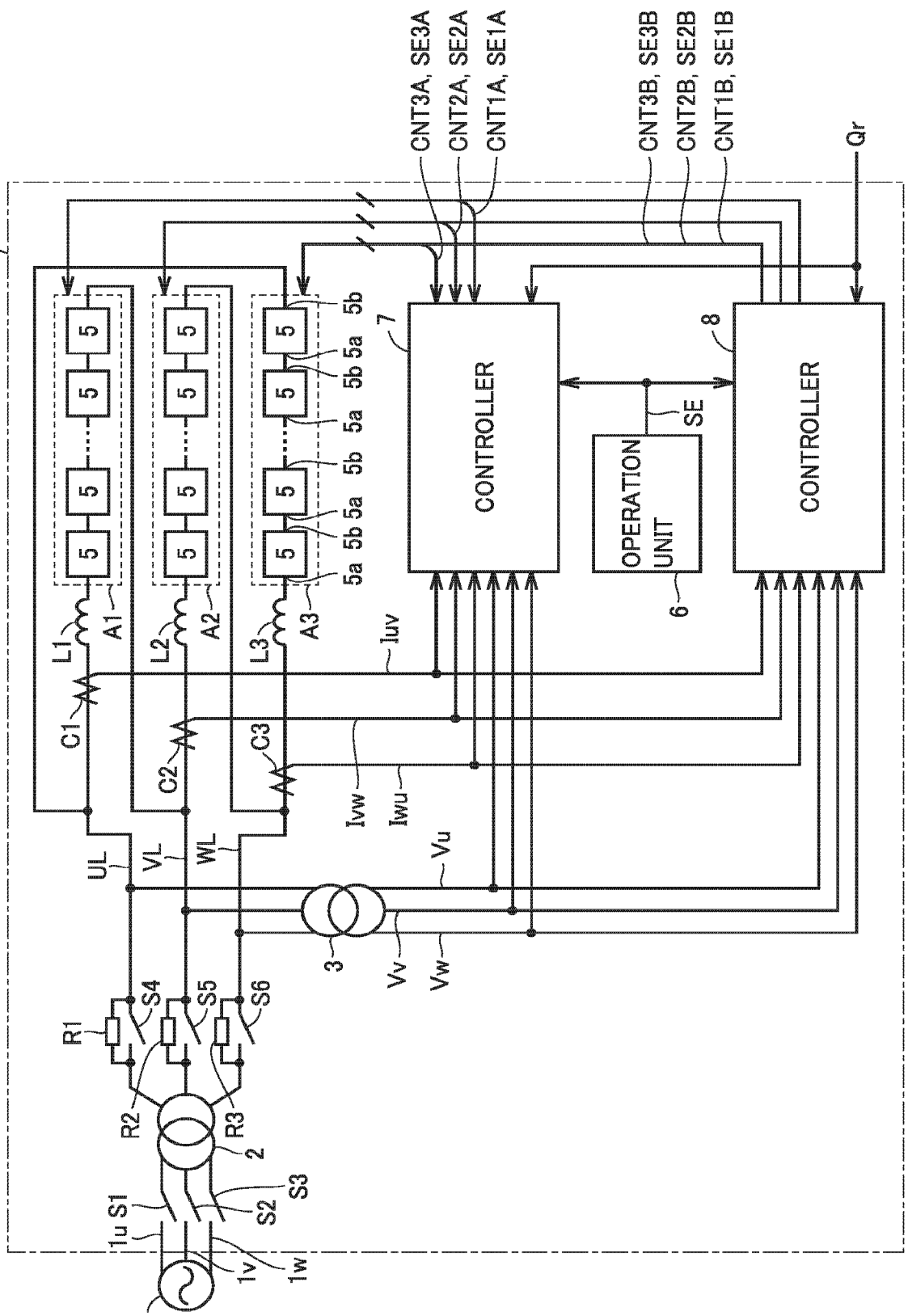
FIG. 1 is a circuit block diagram showing the configuration of a power conversion device in an embodiment.

The embodiments will be hereinafter described in detail with reference to the accompanying drawings, in which the same or corresponding components will be designated by the same reference characters, and description thereof will not be repeated.

FIG. 1 is a circuit block diagram showing the configuration of a power conversion device in an embodiment. Power conversion device 100 is used as a reactive power compensation device that compensates for reactive power in an electric power system 1 (an AC power supply). Referring to FIG. 1, power conversion device 100 includes: arms A1 to A3 each configured with a series connection of at least one or more unit converters 5 in a main circuit power supply system; and two controllers 7 and 8 each configured to control all of unit converters 5. More specifically, power conversion device 100 includes switches S1 to S6, transformers 2 and 3, current-limiting resistors R1 to R3, AC lines UL, VL, and WL, current transformers C1 to C3, reactors L1 to L3, arms A1 to A3, an operation unit 6, and controllers 7 and 8.

Switches S1, S2 and S3 each have: one terminal connected to a corresponding one of power transmission lines $1u$, $1v$, and $1w$ of three phases in electric power system 1;

and the other terminal connected to a corresponding one of three primary windings of transformer 2. Switches S1, S2 and S3 each are in a conductive state under a normal condition, and set in a non-conductive state, for example, during maintenance of power conversion device 100. Transformer 2 includes three primary windings and three secondary windings, and transmits and receives three-phase AC power.

Current-limiting resistors R1, R2 and R3 each have: one terminal connected to a corresponding one of three secondary windings of transformer 2; and the other terminal connected to a corresponding one of AC lines UL, VL, and WL. Current-limiting resistors R1 to R3 each limit a current flowing through a corresponding one of arms A1 to A3 from electric power system 1 when power conversion device 100 is activated.

Switches S4, S5 and S6 are connected in parallel to current-limiting resistors R1, R2 and R3, respectively. Switches S4 to S6 each are set in a conductive state after the current flowing through a corresponding one of arms A1 to A3 is stabilized when power conversion device 100 is activated. Transformer 3 outputs three-phase AC voltages Vu, Vv and Vw of values corresponding to the AC voltages on AC lines UL, VL, and WL, respectively, to each of controllers 7 and 8.

Reactor L1 and arm A1 are connected in series between AC line UL and AC line VL. Reactor L2 and arm A2 are connected in series between AC line VL and AC line WL. Reactor L3 and arm A3 are connected in series between AC line WL and AC line UL. In other words, arms A1 to A3 are delta-connected. Arms A1 to A3 are controlled by a controller that is selected from controllers 7 and 8 to generate three-phase AC power.

Each of arms A1 to A3 includes a plurality of unit converters 5 that are cascade-connected. Each of the plurality of unit converters 5 is controlled by a controller selected from controllers 7 and 8 and generates AC power.

A first terminal 5a of unit converter 5 in the first stage of arm A1 is connected to one terminal of reactor L1. In arm A1, a second terminal 5b of each of unit converters 5 other than unit converter 5 in the last stage is connected to a corresponding one of first terminals 5a of unit converters 5 in the subsequent stages. Second terminal 5b of unit converter 5 in the last stage in arm A1 is connected to one terminal of reactor L2.

A first terminal 5a of unit converter 5 in the first stage in arm A2 is connected to one terminal of reactor L2. In arm A2, a second terminal 5b of each of unit converters 5 other than unit converter 5 in the last stage is connected to a corresponding one of first terminals 5a of unit converters 5 in the subsequent stages. Second terminal 5b of unit converter 5 in the last stage in arm A2 is connected to one terminal of reactor L3.

A first terminal 5a of unit converter 5 in the first stage in arm A3 is connected to one terminal of reactor L3. In arm A3, a second terminal 5b of each of unit converters 5 other than unit converter 5 in the last stage is connected to a corresponding one of first terminals 5a of unit converters 5 in the subsequent stages. Second terminal 5b of unit converter 5 in the last stage in arm A3 is connected to one terminal of reactor L1.

Reactors L1, L2 and L3 suppress the circulating currents flowing through arms A1, A2 and A3, respectively. Reactors L1, L2 and L3 may be provided separately from arms A1, A2 and A3, respectively, or may be inductance components of arms A1, A2 and A3, respectively. Current transformers C1, C2 and C3 (current detectors) detect instantaneous values of AC currents Iuv, Ivw and Iwu flowing through arms A1, A2 and A3, respectively, and output the detected instantaneous values to each of controllers 7 and 8.

Operation unit 6 (selection unit) includes a plurality of buttons, a plurality of switches, an image display device, and the like, and is operated by a user of power conversion device 100. By operating operation unit 6, the user of power conversion device 100 can select a desired controller from controllers 7 and 8, and can start or stop the operation of power conversion device 100.

Operation unit 6 sets a selection signal SE to an L level when controller 7 is selected, and sets selection signal SE to an H level when controller 8 is selected. For example, under a normal condition, selection signal SE is set to an L level, and controller 7 controls arms A1 to A3. During maintenance of controller 7, selection signal SE is set to an H level, and controller 8 controls arms A1 to A3. When the maintenance of controller 7 ends, selection signal SE is set to an L level, and controller 7 controls arms A1 to A3.

Based on selection signal SE, a reactive power command value Qr, three-phase AC voltages Vu, Vv, Vw, three-phase AC currents Iuv, Ivw, Iwu, and a plurality of DC voltages Vdc, controller 7 generates control signals CNT1A to CNT3A and selection command signals SE1A to SE3A. In this case, reactive power command value Qr is provided, for example, from a center control unit (not shown) in electric power system 1. Power conversion device 100 supplies reactive power of the value corresponding to reactive power command value Qr to electric power system 1. The plurality of DC voltages Vdc are supplied from respective unit converters 5. DC voltage Vdc will be described later.

Control signal CNT1A and selection command signal SE1A are provided to each unit converter 5 in arm A1. Control signal CNT2A and selection command signal SE2A are provided to each unit converter 5 in arm A2. Control signal CNT3A and selection command signal SE3A are provided to each unit converter 5 in arm A3.

Based on selection signal SE, reactive power command value Qr, three-phase AC voltages Vu, Vv, Vw, three-phase AC currents Iuv, Ivw, Iwu, and the plurality of DC voltages Vdc (described later), controller 8 generates control signals CNT1B to CNT3B and selection command signals SE1B to SE3B. Control signal CNT1B and selection command signal SE1B are provided to each unit converter 5 in arm A1. Control signal CNT2B and selection command signal SE2B are provided to each unit converter 5 in arm A2. Control signal CNT3B and selection command signal SE3B are provided to each unit converter 5 in arm A3.

When controller 7 is selected, selection command signals SE1A to SE3A each are set to an H level while selection command signals SE1B to SE3B each are set to an L level. Then, arms A1 to A3 generate three-phase AC power according to control signals CNT1A to CNT3A that are output from controller 7.

When controller 8 is selected, selection command signals SE1A to SE3A each are set to an L level while selection command signals SE1B to SE3B each are set to an H level. Then, arms A1 to A3 generate three-phase AC power according to control signals CNT1B to CNT3B that are output from controller 8.

Figure 2:
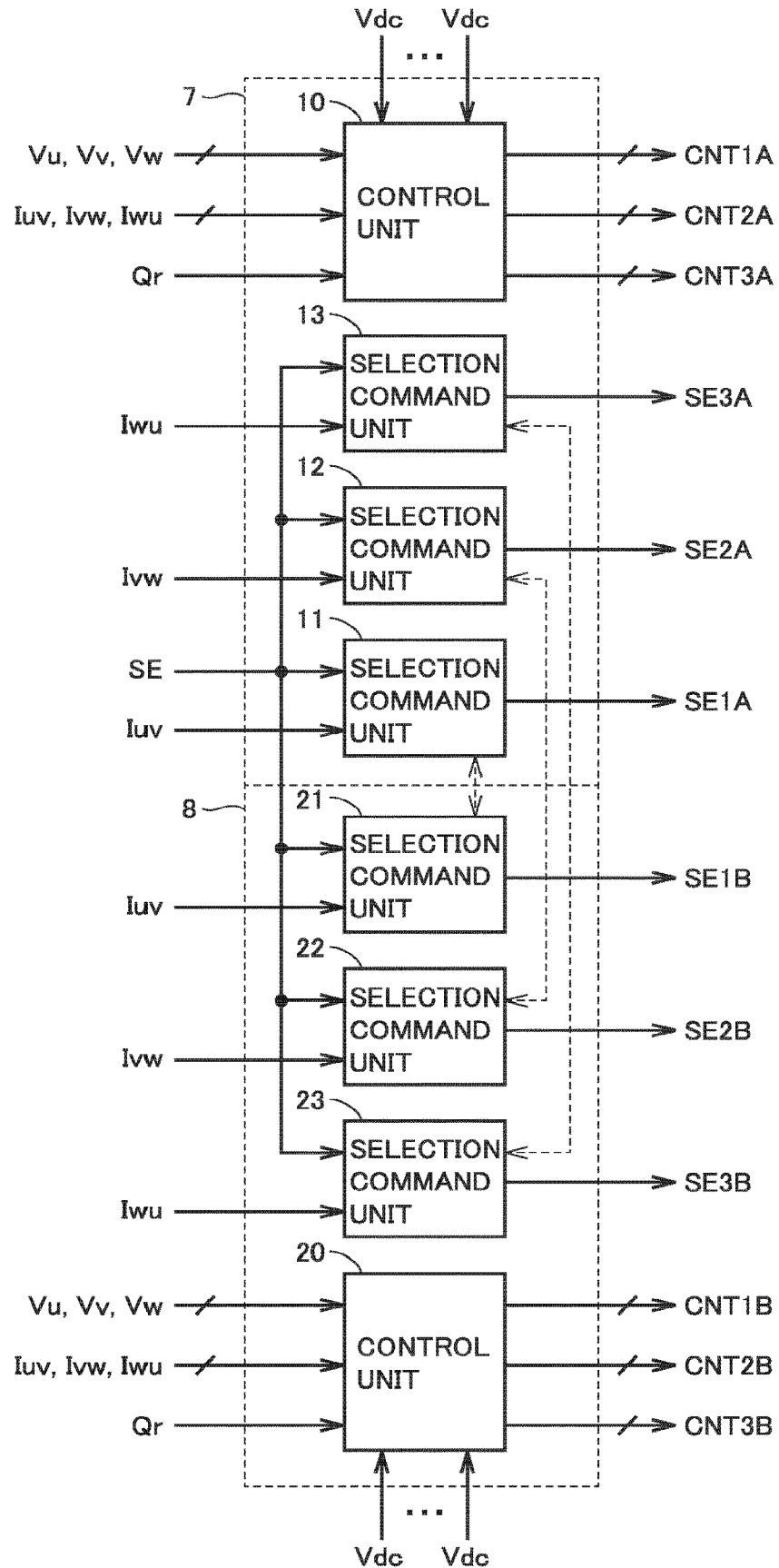
FIG. 2 is a block diagram showing main parts of controllers 7 and 8 shown in FIG. 1.

FIG. 2 is a block diagram showing the configuration of controllers 7 and 8. In FIG. 2, controller 7 includes a control unit 10 and selection command units 11 to 13 while controller 8 includes a control unit 20 and selection command units 21 to 23.

Based on reactive power command value Qr, three-phase AC voltages Vu, Vv, Vw, three-phase AC currents Iuv, Ivw, Iwu, and a plurality of DC voltages Vdc, control unit 10 generates control signals CNT1A to CNT3A.

Specifically, based on AC currents Iuv, Ivw, and Iwu from current transformers C1, C2 and C3, respectively, control unit 10 calculates three-phase AC currents Iu, Iv, and Iw of the levels corresponding to the AC currents flowing through AC lines UL, VL, and WL, respectively. It is to be noted that Iu=Iuv−Iwu, Iv=Ivw−Iuv, and Iw=Iwu−Ivw.

Control unit 10 calculates reactive power Q0 based on three-phase AC voltages Vu, Vv, and Vw from transformer 3 and three-phase AC currents Iu, Iv, and Iw mentioned above. Controller 7 calculates a deviation $\Delta Q$ between reactive power command value Qr and reactive power Q0 ($\Delta Q=Qr-Q0$).

Based on AC currents Iuv, Ivw and Iwu from current transformers C1, C2 and C3, respectively, and three-phase AC voltages Vu, Vv and Vw from transformer 3, and the like, control unit 10 generates a plurality of voltage command values Vdcr corresponding to their respective unit converters 5.

Control unit 10 calculates a deviation $\Delta Vdc$ between voltage command value Vdcr and DC voltage Vdc. Control unit 10 performs the control operation for setting voltage deviation $\Delta Vdc$ to be zero and for setting reactive power deviation $\Delta Q$ to be zero, to thereby generate three-phase AC voltage command values Vuvr, Vvwr, and Vwur.

In other words, control unit 10 provides control signals CNT1A, CNT2A and CNT3A to arms A1, A2 and A3, respectively, to thereby perform active current control for each unit converter 5 such that voltage deviation $\Delta Vdc$ becomes zero and also perform reactive current control for each unit converter 5 such that reactive power deviation $\Delta Q$ becomes zero.

Based on three-phase AC voltage command values Vuvr, Vvwr and Vwur, each of unit converters 5 in each of arms A1 to A3 is operated, and DC voltage Vdc becomes equal to voltage command value Vdcr while reactive power Q0 becomes equal to reactive power command value Qr.

Control unit 20 has the same configuration as that of control unit 10. Based on reactive power command value Qr, three-phase AC voltages Vu, Vv, Vw, three-phase AC currents Iuv, Ivw, Iwu, and the plurality of DC voltages Vdc, control unit 20 generates control signals CNT1B to CNT3B.

In the case where selection signal SE is set at an H level (that is, in the case where controller 8 is selected), selection command unit 11 sets selection command signal SE1A to an L level. In the case where selection signal SE is set to an L level (that is, in the case where controller 7 is selected), selection command unit 11 raises selection command signal SE1A to an H level when the absolute value of AC current Iuv flowing through arm A1 decreases below a prescribed threshold current ITH (a predetermined value) (that is, when AC current Iuv passes through a zero cross point). It should be noted that threshold current ITH is a value sufficiently smaller than the peak value of AC current Iuv, and set at approximately 0A.

In the case where selection signal SE is set at an L level (that is, in the case where controller 7 is selected), selection command unit 21 sets selection command signal SE1B to an L level. In the case where selection signal SE is set to an H level (that is, in the case where controller 8 is selected), selection command unit 21 raises selection command signal SE1B to an H level when the absolute value of AC current Iuv flowing through arm A1 decreases below prescribed threshold current ITH (that is, when AC current Iuv passes through the zero cross point). As indicated by a dotted line in FIG. 2, a signal is transmitted and received between selection command units 11 and 21. Selection command signal SE1B is an inverted signal of selection command signal SE1A.

In the case where selection signal SE is set at an H level (that is, in the case where controller 8 is selected), selection command unit 12 sets selection command signal SE2A to an L level. In the case where selection signal SE is set to an L level (that is, in the case where controller 7 is selected), selection command unit 12 raises selection command signal SE2A to an H level when the absolute value of AC current Ivw flowing through arm A2 decreases below prescribed threshold current ITH (that is, when AC current Ivw passes through the zero cross point).

In the case where selection signal SE is set at an L level (that is, in the case where controller 7 is selected), selection command unit 22 sets selection command signal SE2B to an L level. In the case where selection signal SE is set at an H level (that is, in the case where controller 8 is selected), selection command unit 22 raises selection command signal SE2B to an H level when the absolute value of AC current Ivw flowing through arm A2 decreases below prescribed threshold current ITH (that is, when AC current Ivw passes through the zero cross point). As indicated by a dotted line in FIG. 2, a signal is transmitted and received between selection command units 12 and 22, and selection command signal SE2B is an inverted signal of selection command signal SE2A.

In the case where selection signal SE is set at an H level (that is, in the case where controller 8 is selected), selection command unit 13 sets selection command signal SE3A to an L level. In the case where selection signal SE is set at an L level (that is, in the case where controller 7 is selected), selection command unit 13 raises selection command signal SE3A to an H level when the absolute value of AC current Iwu flowing through arm A3 decreases below prescribed threshold current ITH (that is, when AC current Iwu passes through the zero cross point).

In the case where selection signal SE is set at an L level (that is, in the case where controller 7 is selected), selection command unit 23 sets selection command signal SE3B to an L level. In the case where selection signal SE is set at an H level (that is, in the case where controller 8 is selected), selection command unit 23 raises selection command signal SE3B to an H level when the absolute value of AC current Iwu flowing through arm A3 decreases below prescribed threshold current ITH (that is, when AC current Iwu passes through the zero cross point). As indicated by a dotted line in FIG. 2, a signal is transmitted and received between selection command units 13 and 23, and selection command signal SE3B is an inverted signal of selection command signal SE3A.

Figure 3:
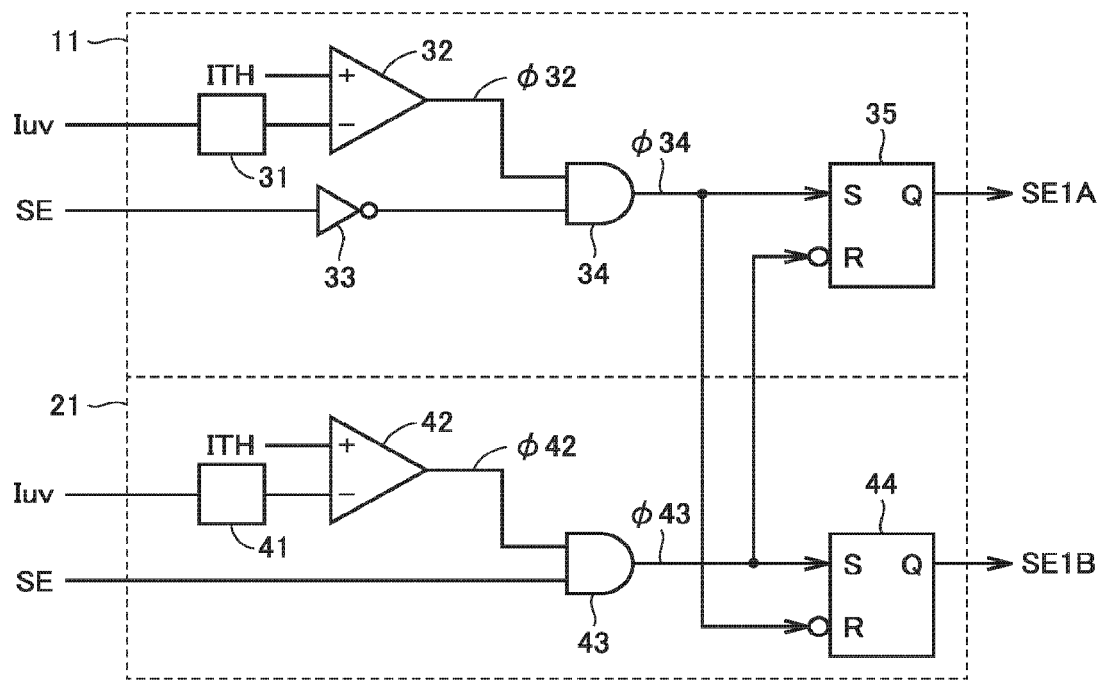
FIG. 3 is a circuit block diagram showing the configuration of selection command units 11 and 21 shown in FIG. 2.

FIG. 3 is a circuit block diagram showing the configuration of selection command units 11 and 21 shown in FIG. 2. In FIG. 3, selection command unit 11 includes an absolute value detector 31, a comparator 32, an inverter 33, an AND gate 34, and a flip-flop 35. Selection command unit 21 includes an absolute value detector 41, a comparator 42, an AND gate 43, and a flip-flop 44.

Absolute value detector 31 detects an absolute value |Iuv| of AC current Iuv that flows through corresponding arm A1. Comparator 32 has: a non-inverted input terminal (+terminal) to which threshold current ITH is provided; and an inverted input terminal (−terminal) to which an absolute value |Iuv| of AC current Iuv is provided. Comparator 32 compares the magnitudes between threshold current ITH and absolute value Rind of AC current Iuv and outputs a signal $\phi 32$ that shows the comparison result.

In the case where |Iuv|>ITH, signal φ32 is set to an L level. In the case where |Iuv|<ITH, signal φ32 is set to an H level. Since ITH OA, signal φ32 is set to an H level when AC current Iuv passes through the zero cross point.

Absolute value detector 41 detects absolute value |Iuv| of AC current Iuv that flows through corresponding arm A1. Comparator 42 has: a non-inverted input terminal (+terminal) to which threshold current ITH is provided; and an inverted input terminal (−terminal) to which absolute value |Iuv| of AC current Iuv is provided. Comparator 42 compares the magnitudes between threshold current ITH and absolute value |Iuv| of AC current Iuv, and outputs a signal φ42 that shows the comparison result.

In the case where |Iuv|>ITH, signal φ42 is set to an L level. In the case where |Iuv|<ITH, signal φ42 is set to an H level. Since ITH OA, signal φ42 is set to an H level when AC current Iuv passes through the zero cross point.

Inverter 33 outputs an inverted signal of selection signal SE. AND gate 34 outputs a logical AND signal φ34 of: output signal φ32 from comparator 32; and the output signal from inverter 33. AND gate 43 outputs a logical AND signal φ43 of: output signal φ42 from comparator 42; and selection signal SE.

Output signal φ34 from AND gate 34 is provided to a set terminal (S) of flip-flop 35 and provided to a reset terminal (R) of flip-flop 44. Output signal φ43 from AND gate 43 is provided to a set terminal (S) of flip-flop 44 and provided to a reset terminal (R) of flip-flop 35. The signals appearing at the output terminals (Q) of flip-flops 35 and 44 are selection command signals SE1A and SE1B, respectively.

In the case where selection signal SE is set at an L level (that is, in the case where controller 7 is selected), output signal φ43 from AND gate 43 is fixed to an L level and the output signal from inverter 33 is set to an H level. Then, output signal φ32 from comparator 32 passes through AND gate 34 to be provided to the set terminal of flip-flop 35 and the reset terminal of flip-flop 44. When AC current Iuv passes through the zero cross point, output signal φ32 from comparator 32 is set to an H level, flip-flop 35 is set, flip-flop 44 is reset, and selection command signals SE1A and SE1B are set to an H level and an L level, respectively.

In the case where selection signal SE is set at an H level (that is, in the case where controller 8 is selected), output signal φ34 from AND gate 34 is fixed to an L level and output signal φ42 from comparator 42 passes through AND gate 43 to be provided to the reset terminal of flip-flop 35 and the set terminal of flip-flop 44. When AC current Iuv passes through the zero cross point, output signal φ42 from comparator 42 is set to an H level, flip-flop 35 is reset, flip-flop 44 is set, and selection command signals SE1A and SE1B are set to an L level and an H level, respectively.

In other words, signals φ34 and φ43 are transmitted and received between selection command units 11 and 21. Selection command signal SE1B is an inverted signal of selection command signal SE1A. Selection command units 12 and 22 are identical in configuration to selection command units 11 and 21, respectively, and selection command units 13 and 23 are identical in configuration to selection command units 11 and 21, respectively. Thus, the detailed description thereof will not be repeated.

Figure 4:
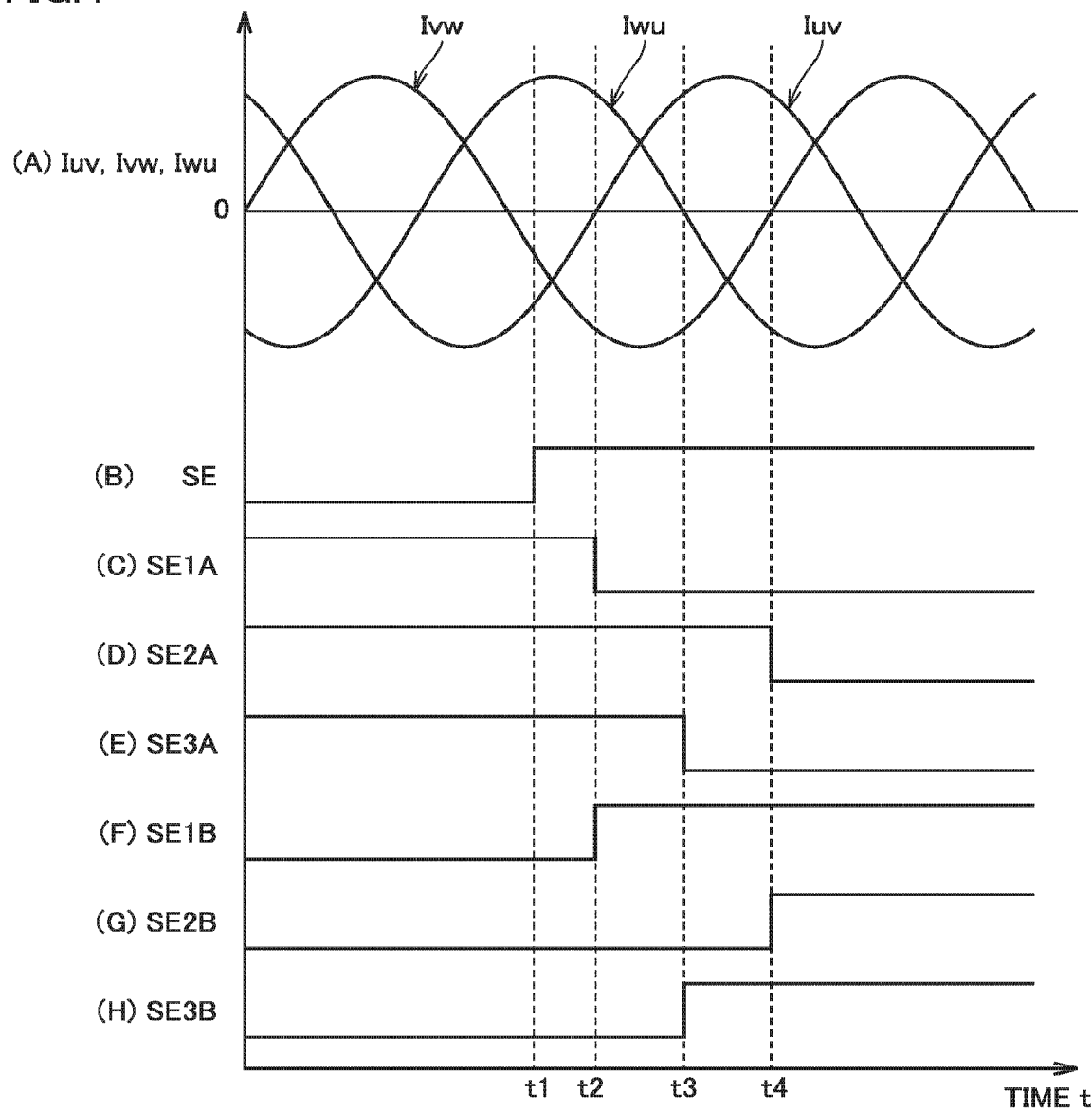
FIG. 4 shows time charts illustrating the operations of selection command units 11 to 13 and 21 to 23 shown in FIG. 2.

FIG. 4 shows time charts illustrating the operations of selection command units 11 to 13 and 21 to 23 shown in FIGS. 2 and 3. In FIG. 4, (A) shows waveforms of three-phase AC currents Iuv, Ivw, and Iwu; (B) shows a waveform of selection signal SE; (C), (D) and (E) show waveforms of selection command signals SE1A, SE2A and SE3A, respectively; and (F), (G) and (H) show waveforms of selection command signals SE1B, SE2B and SE3B, respectively.

At time t0, selection signal SE is set at an L level. In the case where selection signal SE is set at an L level, when AC currents Iuv, Ivw, and Iwu pass through the zero cross point, flip-flop 35 of each of selection command units 11 to 13 is set while flip-flop 44 of each of selection command units 21 to 23 is reset. Then, selection command signals SE1A to SE3A each are set to an H level while selection command signals SE1B to SE3B each are set to an L level.

When selection signal SE is raised from an L level to an H level at time t1, then, in each of selection command units 11, 21, selection command units 12, 22, and selection command units 13, 23, output signal φ34 from AND gate 34 is fixed to an L level, and output signal φ42 from comparator 42 passes through AND gate 43 to be provided to the reset terminal (R) of flip-flop 35 and the set terminal (S) of flip-flop 44.

When AC current Iuv passes through the zero cross point at time t2, then, in selection command unit 21, output signal φ42 from comparator 42 is set to an H level, flip-flop 35 is reset, flip-flop 44 is set, selection command signal SE1A is set to an L level, and selection command signal SE1B is set to an H level.

When AC current Iwu passes through the zero cross point at time t3, then, in selection command unit 23, output signal 442 from comparator 42 is set to an H level, flip-flop 35 is reset, flip-flop 44 is set, selection command signal SE3A is set to an L level, and selection command signal SE3B is set to an H level.

When AC current Ivw passes through the zero cross point at time t4, then, in selection command unit 22, output signal φ42 from comparator 42 is set to an H level, flip-flop 35 is reset, flip-flop 44 is set, selection command signal SE2A is set to an L level, and selection command signal SE2B is set to an H level.

Figure 5:
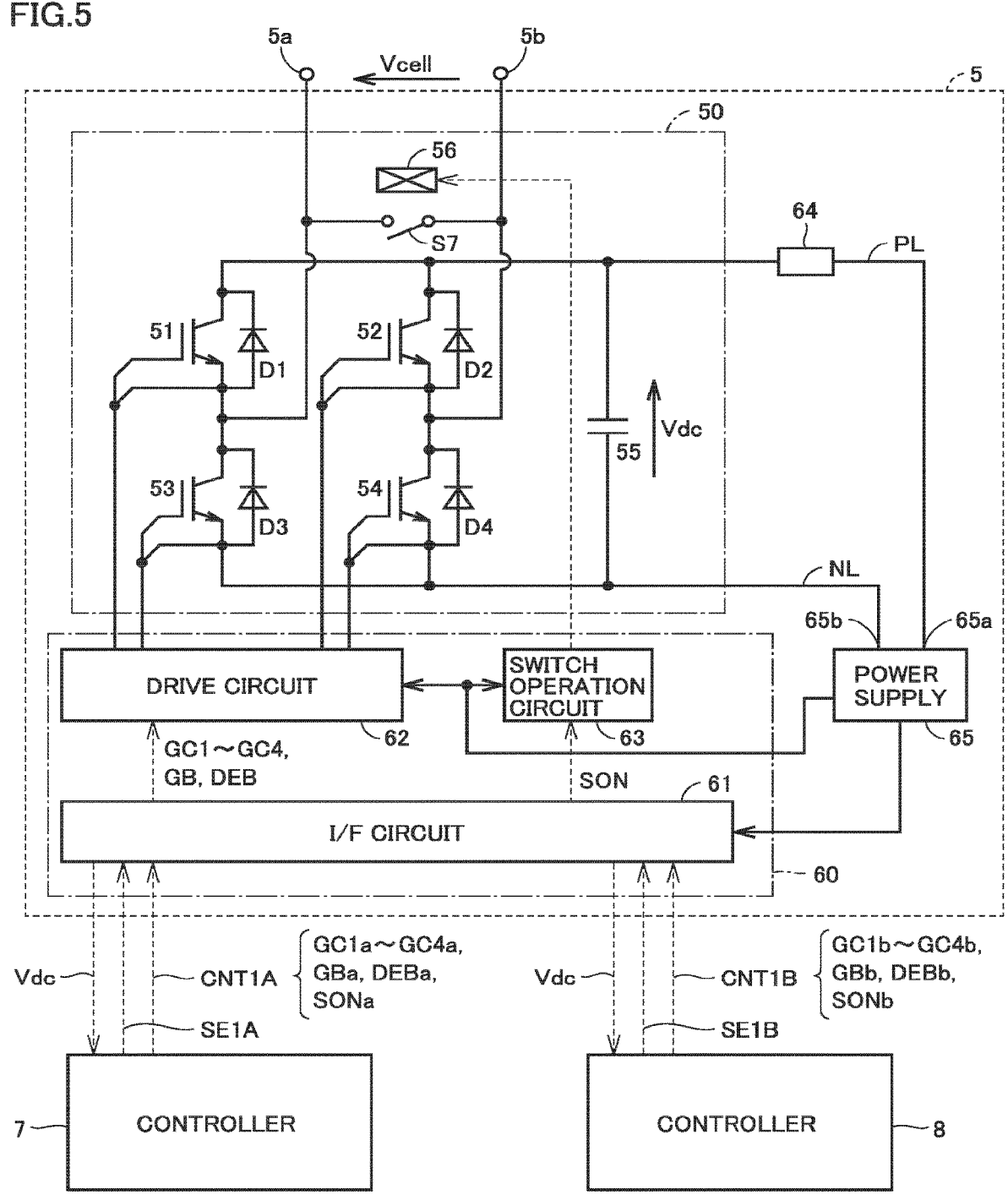
FIG. 5 is a circuit block diagram showing the configuration of a unit converter 5 shown in FIG. 1.

FIG. 5 is a circuit block diagram showing the configuration of unit converter 5 shown in FIG. 1. Referring to FIG. 5, unit converter 5 includes a main circuit 50, a control circuit 60, a current-limiting resistance circuit 64, and a power supply 65. FIG. 5 shows unit converter 5 included in arm A1. This unit converter 5 receives control signal CNT1A and selection command signal SE1A from controller 7 and receives control signal CNT1B and selection command signal SE1B from controller 8.

Main circuit 50 is formed of a full bridge circuit including a capacitor. Specifically, main circuit 50 has a first terminal 5a and a second terminal 5b. Main circuit 50 includes switching elements 51 to 54, diodes D1 to D4, and a capacitor 55. Main circuit 50 controls conduction/non-conduction of each of switching elements 51 to 54 to output the voltage pulse of the amplitude corresponding to the voltage of capacitor 55 between first terminal 5a and second terminal 5b, thereby performing power conversion.

Switching elements 51 to 54 each are a self-arc-extinguishing-type power semiconductor element and formed of an insulated gate bipolar transistor (IGBT), for example. Switching elements 51 and 53 are connected in series between a first DC line PL and a second DC line NL. Switching elements 52 and 54 are connected in series between first DC line PL and second DC line NL. The collectors of switching elements 51 and 52 are connected to first DC line PL while the emitters of switching elements 53 and 54 are connected to second DC line NL. The connection point between the emitter of switching element 51 and the collector of switching element 53 is connected to first terminal 5a. The connection point between the emitter of switching element 52 and the collector of switching element 54 is connected to second terminal 5*b*.

Diodes D1, D2, D3, and D4 are connected in anti-parallel with switching elements 51, 52, 53, and 54, respectively. Capacitor 55 is electrically connected between first DC line PL and second DC line NL and stores DC power therein.

In unit converter 5, conduction/non-conduction of each of switching elements 51 to 54 is controlled by control circuit 60. Switching elements 51 and 53 are controlled to be conductive in a manner complementary to each other. Switching elements 52 and 54 are controlled to be conductive in a manner complementary to each other. As shown in FIG. 5, assuming that the voltage to first terminal 5*a* with respect to second terminal 5*b* is defined as a cell voltage Vcell, cell voltage Vcell is controlled by conduction/non-conduction of each of switching elements 51 to 54.

Specifically, when each of switching elements 51 and 54 is in a conductive state and when each of switching elements 52 and 53 is in a non-conductive state, cell voltage Vcell is approximately equal to DC voltage Vdc on capacitor 55. When each of switching elements 51 and 52 is in a conductive state and when each of switching elements 53 and 54 is in a non-conductive state, cell voltage Vcell is approximately zero. When each of switching elements 51 and 52 is in a non-conductive state and when each of switching elements 53 and 54 is in a conductive state, cell voltage Vcell is approximately zero. When each of switching elements 51 and 54 is in a non-conductive state and when each of switching elements 52 and 53 is in a conductive state, cell voltage Vcell is approximately equal to the voltage that is obtained by inverting the polarity of DC voltage Vdc on capacitor 55.

The entire voltage on arms A1 to A3 is represented by the sum of cell voltages Vcell on unit converters 5 included in each of corresponding arms A1 to A3. Accordingly, the entire voltage on arms A1 to A3 can be controlled by conduction/non-conduction of each of switching elements 51 to 54 that form each of unit converters 5.

Main circuit 50 further includes a switch S7. Switch S7 is connected between first terminal 5*a* and second terminal 5*b*. Switch S7 is closed according to a conduction command signal Son from control circuit 60 so as to allow short-circuiting of first terminal 5*a* and second terminal 5*b*.

Control circuit 60 includes an interface (I/F) circuit 61, a drive circuit 62, and a switch operation circuit 63. Control circuit 60 is configured to control each of switching elements 51 to 54 to be conductive/non-conductive according to control signal CNT1A and selection command signal SE1A received from controller 7 and control signal CNT1B and selection command signal SE1B received from controller 8.

I/F circuit 61 communicates with controllers 7 and 8 by wire (not shown) or wirelessly. I/F circuit 61 receives control signals CNT1A and CNT1B from controllers 7 and 8, respectively. Control signal CNT1A includes: gate signals GC1*a* to GC4*a* for controlling the full bridge circuit of main circuit 50; a gate block signal GBa for fixing each of switching elements 51 to 54 forming a full bridge circuit in a non-conductive state; a gate deblock signal DEBa for canceling fixation of the non-conductive states of switching elements 51 to 54 forming a full bridge circuit; and a conduction command signal SONa for bringing switch S7 into a conductive state when a failure occurs in corresponding unit converter 5. Similarly to control signal CNT1A, control signal CNT1B includes gate signals GC1*b* to GC4*b*, a gate block signal GBb, a gate deblock signal DEBb, and a conduction command signal SONb.

More specifically, when each of switching elements 51 to 54 is fixed in a non-conductive state, gate block signals GBa and GBb each are activated to an H level. As gate block signals GBa and GBb each are activated to an H level, gate deblock signals DEBa and DEBb each are deactivated to an L level.

When fixation of the non-conductive states of switching elements 51 to 54 is cancelled, gate deblock signals DEBa and DEBb each are activated to an H level. As gate deblock signals DEBa and DEBb each are activated to an H level, gate block signals GBa and GBb each are deactivated to an L level.

When a failure occurs in corresponding unit converter 5, conduction command signals SONa and SONb each are activated to an H level. When corresponding unit converter 5 normally operates, conduction command signals SONa and SONb each are deactivated to an L level.

Furthermore, from controllers 7 and 8, I/F circuit 61 receives respective selection command signals SE1A and SE1B for selecting one of control signals CNT1A and CNT1B. When control signal CNT1A is selected, selection command signals SE1A and SE1B are set to an H level and an L level, respectively. When control signal CNT1B is selected, selection command signals SE1A and SE1B are set to an L level and an H level, respectively.

When selection command signals SE1A and SE1B are set to an H level and an L level, respectively, I/F circuit 61 provides signals GC1*a* to GC4*a*, signal GBa and signal DEBa received from controller 7 as gate signals GC1 to GC4, a gate block signal GB, and a gate deblock signal DEB, respectively, to drive circuit 62. Also, I/F circuit 61 provides signal SONa received from controller 7 as conduction command signal SON to switch operation circuit 63.

When selection command signals SE1A and SE1B are set to an L level and an H level, respectively, I/F circuit 61 provides signals GC1*b* to GC4*b*, signal GBb, and signal DEBb received from controller 8 as gate signals GC1 to GC4, gate block signal GB, and gate deblock signal DEB, respectively, to drive circuit 62. Also, I/F circuit 61 provides signal SONb received from controller 8 as conduction command signal SON to switch operation circuit 63.

In response to gate signals GC1 to GC4, drive circuit 62 controls conduction/non-conduction of each of switching elements 51 to 54. In response to gate block signal GB, drive circuit 62 fixes each of switching elements 51 to 54 in a non-conductive state (a deactivated state or a gate block state). In response to gate deblock signal DEB, drive circuit 62 cancels fixation of the non-conductive states of switching elements 51 to 54 (to be not in a gate block state or to be in a gate deblock state).

In other words, when gate block signal GB is at an H level and gate deblock signal DEB is at an L level, switching elements 51 to 54 each are brought into a gate block state. When gate block signal GB is at an L level and gate deblock signal DEB is at an H level, switching elements 51 to 54 each are brought into a state not in the gate block state.

Controllers 7 and 8 simultaneously control the levels of respective gate block signals GBa and GBb and the levels of respective gate deblock signals DEBa and DEBb to be provided to each of unit converters 5 in arm A1. Thereby, switching elements 51 to 54 in each of unit converters 5 in arm A1 are simultaneously brought into non-conductive states, and also, fixation of the non-conductive states of switching elements 51 to 54 is simultaneously canceled. The same also applies to arms A2 and A3.

Switch operation circuit 63 serves as a circuit for operating switch S7. Switch operation circuit 63 controls power conduction to an exciting coil 56 according to conduction command signal SON. During the normal operation, current supply to exciting coil 56 is stopped, and therefore, switch S7 is brought into a non-conductive state. On the other hand, when controllers 7 and 8 detect an abnormality such as a short-circuit fault in the switching element in one unit converter 5 of the plurality of unit converters 5, controllers 7 and 8 set, to H levels, respective conduction command signals SONa and SONb corresponding to this one unit converter 5 having such a fault.

In unit converter 5 having a fault, I/F circuit 61 outputs signal SONa or SONb as conduction command signal SON to switch operation circuit 63. As conduction command signal SON is set to an H level, switch operation circuit 63 supplies a current to exciting coil 56, to thereby bring switch S7 into a conductive state. Thus, the output of unit converter 5 having a fault is short-circuited.

Current-limiting resistance circuit 64 is interposed in first DC line PL between main circuit 50 and power supply 65. Current-limiting resistance circuit 64 lowers DC voltage Vdc of capacitor 55. Power supply 65 includes input terminals 65a and 65b. Input terminal 65a is connected to first DC line PL. Input terminal 65b is connected to second DC line NL. Power supply 65 is electrically connected in parallel to capacitor 55. Power supply 65 lowers the voltage of capacitor 55 to generate a power supply voltage and supplies the power supply voltage to control circuit 60. Thereby, unit converter 5 forms a cell of a self-contained type, which is capable of supplying electric power from main circuit 50 to control circuit 60.

Figure 6:
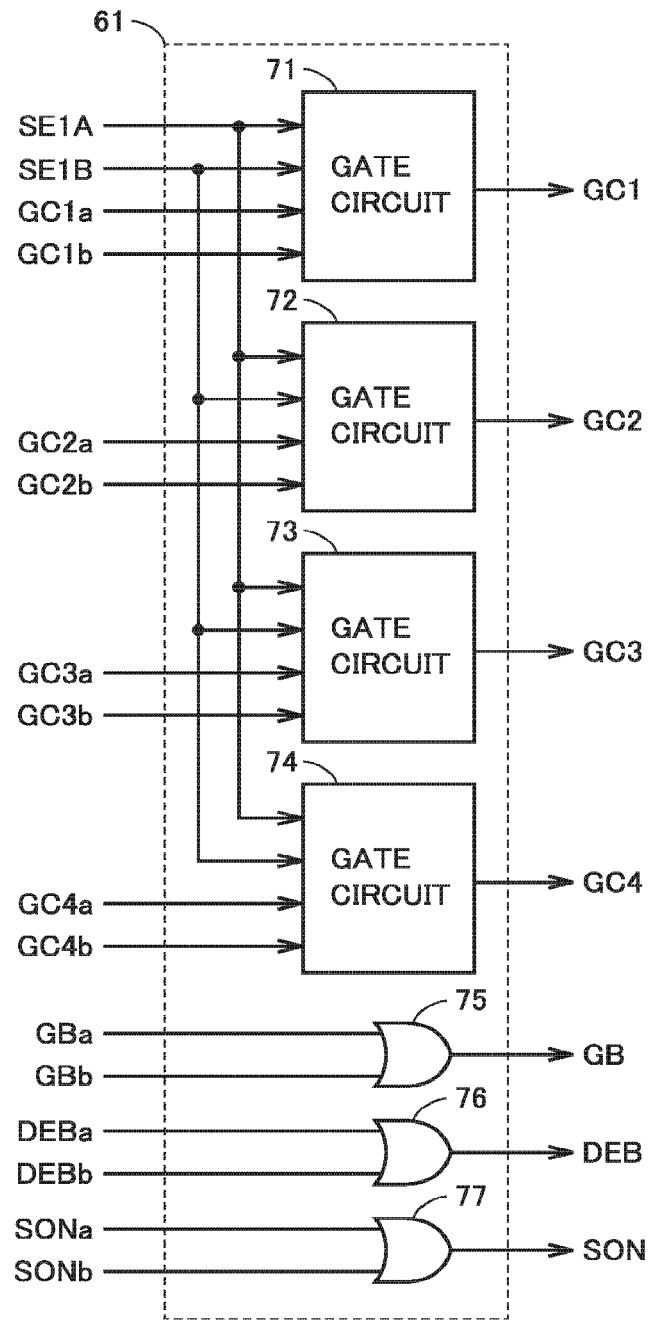
FIG. 6 is a circuit block diagram showing a main part of an I/F circuit 61 shown in FIG. 5.

FIG. 6 is a circuit block diagram showing a main part of I/F circuit 61 shown in FIG. 5. In FIG. 6, I/F circuit 61 includes gate circuits 71 to 74 and OR gates 75 to 77. Selection command signals SE1A and SE1B are provided to each of gate circuits 71 to 74. Gate signals GC1a, GC2a, GC3a, and GC4a are provided to gate circuits 71, 72, 73, and 74, respectively. Gate signals GC1b, GC2b, GC3b, and GC4b are provided to gate circuits 71, 72, 73, and 74, respectively. Gate circuits 71, 72, 73, and 74 output respective gate signals GC1, GC2, GC3, and GC4 to drive circuit 62.

When selection command signals SE1A and SE1B are set to an H level and an L level, respectively, gate signals GC1a, GC2a, GC3a, and GC4a pass through respective gate circuits 71, 72, 73, and 74 and turn into respective gate signals GC1, GC2, GC3, and GC4.

When selection command signals SE1A and SE1B are set to an L level and an H level, respectively, gate signals GC1b, GC2b, GC3b, and GC4b pass through respective gate circuits 71 72, 73, and 74 and turn into respective gate signals GC1, GC2, GC3, and GC4.

When selection command signal SE1A at an H level and selection command signal SE1B at an L level are set to an L level and an H level, respectively, gate signals GC1a, GC2a, GC3a, and GC 4a and gate signals GC1b, GC2b, GC3b, and GC4b are interrupted by respective gate circuits 71, 72, 73, and 74 by a prescribed time period Tc. Thereafter, gate signals GC1b, GC2b, GC3b, and GC4b pass through respective gate circuits 71, 72, 73, and 74 and turn into respective gate signals GC1, GC2, GC3, and GC4.

When selection command signal SE1A at an L level and selection command signal SE1B at an H level are set to an H level and an L level, respectively, gate signals GC1a, GC2a, GC3a, and GC 4a and gate signals GC1b, GC2b, GC3b, and GC4b are interrupted by respective gate circuits 71, 72, 73, and 74 by prescribed time period Tc. Thereafter, gate signals GC1a, GC2a, GC3a, and GC4a pass through respective gate circuits 71, 72, 73, and 74 and turn into respective gate signals GC1, GC2, GC3, and GC4.

Figure 7:
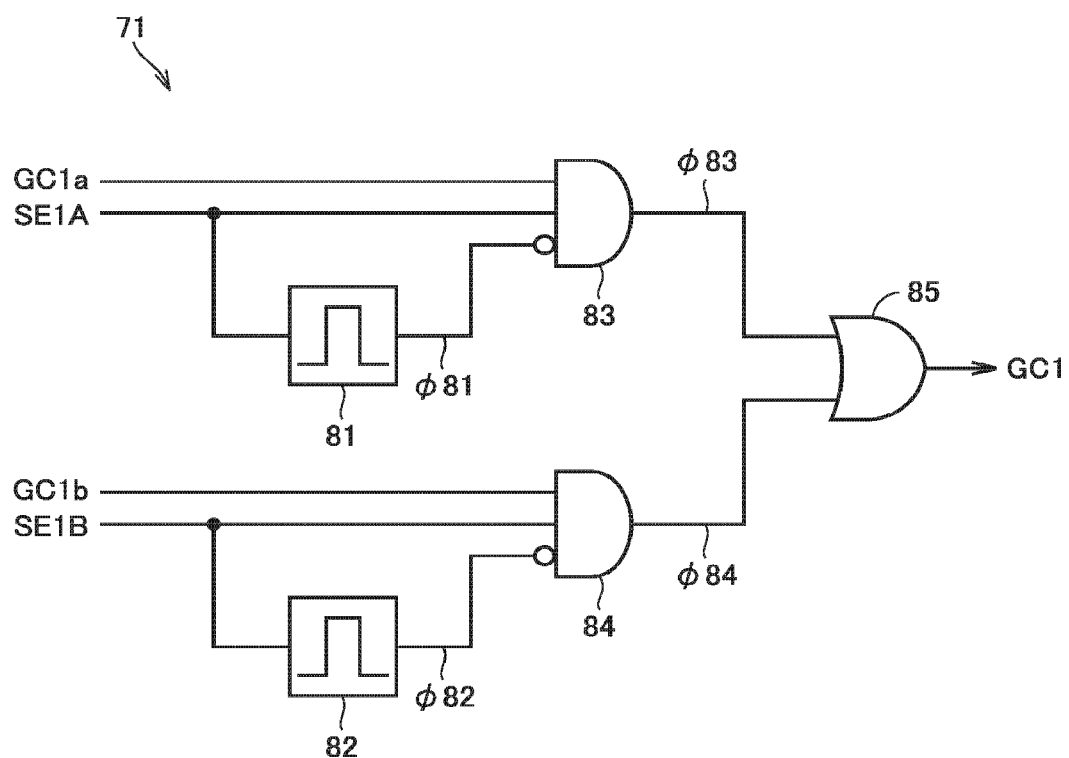
FIG. 7 is a circuit block diagram showing the configuration of a gate circuit 71 shown in FIG. 6.

FIG. 7 is a circuit block diagram showing the configuration of gate circuit 71. In FIG. 7, gate circuit 71 includes one-shot pulse generator circuits 81 and 82, gate circuits 83 and 84, and an OR gate 85.

One-shot pulse generator circuit 81 outputs a signal φ81 in response to selection command signal SE1A. When selection command signal SE1A is set at an L level, signal φ81 is set at an L level. When selection command signal SE1A is raised from an L level to an H level, signal φ81 is kept at an H level by prescribed time period Tc and thereafter set to an L level. When selection command signal SE1A is lowered from an H level to an L level, signal φ81 is immediately set to an L level.

One-shot pulse generator circuit 82 outputs a signal φ82 in response to selection command signal SE1B. When selection command signal SE1B is set at an L level, signal φ82 is set at an L level. When selection command signal SE1B is raised from an L level to an H level, signal φ82 is kept at an H level by prescribed time period Tc and thereafter set to an L level. When selection command signal SE1B is lowered from an H level to an L level, signal φ82 is immediately set to an L level.

Gate circuit 83 receives gate signal GC1a, selection command signal SE1A and signal φ81 and outputs a signal φ83. When selection command signal SE1A is set at an H level and signal φ81 is set at an L level, gate signal GC1a passes through gate circuit 83 and turns into signal φ83. When selection command signal SE1A is set at an L level, gate signal GC1a is interrupted by gate circuit 83 and signal φ83 is fixed at an L level. Furthermore, when signal φ81 is at an H level, gate signal GC1a is interrupted by gate circuit 83 and signal φ83 is fixed at an L level.

Gate circuit 84 receives gate signal GC1b, selection command signal SE1B and signal φ82, and outputs a signal φ84. When selection command signal SE1B is set to an H level and signal φ82 is at an L level, gate signal GC1b passes through gate circuit 84 and turns into signal φ84. When selection command signal SE1B is set at an L level, gate signal GC1b is interrupted by gate circuit 84, and signal φ84 is fixed at an L level. Furthermore, when signal φ82 is at an H level, gate signal Gelb is interrupted by gate circuit 84, and signal φ84 is fixed at an L level. OR gate 85 outputs a logical OR signal of signals φ83 and φ84 as gate signal GC1.

When selection command signals SE1A and SE1B are set at an H level and an L level, respectively, gate signal GC1b is interrupted by gate circuit 84. Then, gate signal GC1a passes through gate circuit 83 and OR gate 85, and then, turns into gate signal GC1.

When selection command signals SE1A and SE1B are set at an L level and an H level, respectively, gate signal GC1a is interrupted by gate circuit 83. Then, gate signal GC1b passes through gate circuit 84 and OR gate 85, and then, turns into gate signal GC1.

When selection command signal SE1A at an H level and selection command signal SE1B at an L level are set to an L level and an H level, respectively, gate signal GC1a is interrupted by gate circuit 83. Furthermore, signal φ82 is raised by one-shot pulse generator circuit 82 to an H level by prescribed time period Tc, and gate signal Gelb is interrupted by gate circuit 84 by prescribed time period Tc. Thereafter, gate signal GC1b passes through gate circuit 84 and OR gate 85, and then, turns into gate signal GC1.

When selection command signal SE1A at an L level and selection command signal SE1B at an H level are set to an H level and an L level, respectively, gate signal Gelb is interrupted by gate circuit 84. Furthermore, signal 481 is raised by one-shot pulse generator circuit 81 to an H level by prescribed time period Tc, and gate signal GC1a is interrupted by gate circuit 83 by prescribed time period Tc. Thereafter, gate signal GC1a passes through gate circuit 83 and OR gate 85, and then, turns into gate signal GC1.

Figure 8:
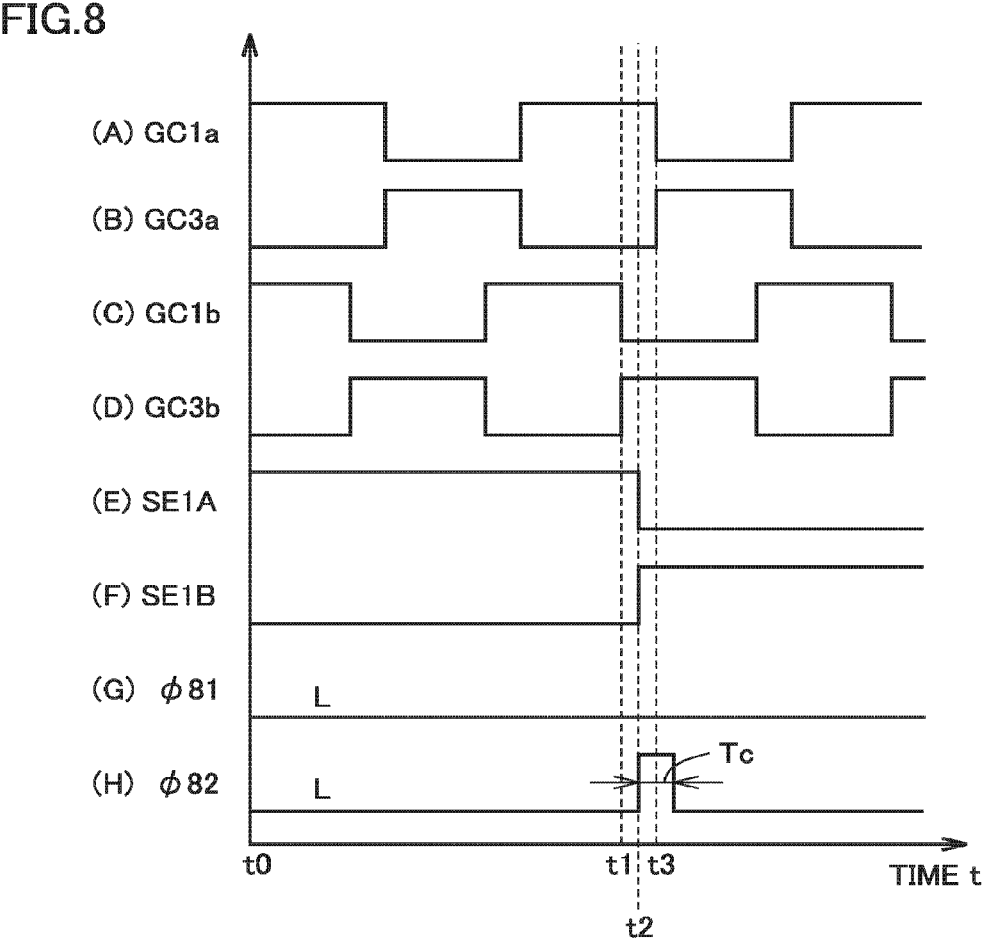
FIG. 8 shows time charts for illustrating the effects and the problems of gate circuits 71 to 74 shown in FIG. 6.

FIG. 8 shows time charts for illustrating the effects and the problems of gate circuits 71 and 73 shown in FIG. 6. In FIG. 8, (A), (B), (C), and (D) show waveforms of gate signals GC1a, GC3a, GC1b, and GC3b, respectively; (E) and (F) show waveforms of selection command signals SE1A and SE1B, respectively; and (G) and (H) show waveforms of one-shot pulse signals ϕ81 and ϕ82, respectively. Each of gate signals GC1a, GC3a, GC1b, and GC3b is a pulse width modulation (PWM) signal.

Gate signal GC1a and gate signal GC3a are complementary to each other. In the following, it is assumed that gate signals GC1a and GC3a are provided to drive circuit 62 (FIG. 5) as gate signals GC1 and GC3, respectively. In this case, when gate signals GC1a and GC3a are set at an H level and an L level, respectively, switching element 51 (FIG. 5) is brought into a conductive state while switching element 53 (FIG. 5) is brought into a non-conductive state. Also, when gate signals GC1a and GC3a are set at an L level and an H level, respectively, switching element 51 is brought into a non-conductive state while switching element 53 is brought into a conductive state.

Similarly, gate signal GC1b and gate signal GC3b are complementary to each other. In the following, it is assumed that gate signals GC1b and GC3b are provided to drive circuit 62 as gate signals GC1 and GC3, respectively. In this case, when gate signals GC1b and GC3b are set at an H level and an L level, respectively, switching element 51 is brought into a conductive state while switching element 53 is brought into a non-conductive state. Also, when gate signals GC and GC3b are set at an L level and an H level, respectively, switching element 51 is brought into a non-conductive state while switching element 53 is brought into a conductive state.

The phases of gate signals GC1a and GC3a generated by controller 7 ideally coincide with, but actually slightly shift from, the phases of gate signal GC1b and GC3b generated by controller 8. FIG. 8 shows the case where the phases of gate signals GC1a and GC3a delay slightly from the phases of gate signals GC1b and GC3b. Thus, there is a time period (time t1 to time t3) during which gate signal GC1a and gate signal GC3b each are at an H level.

In the initial state (time t0), selection command signals SE1A and SE1B are set at an H level and an L level, respectively, and gate signals GC1a and GC3a are provided as gate signals GC1 and GC3 to drive circuit 62 (FIG. 5). Furthermore, at time t2 between time t1 and time t3, selection command signals SE1A and SE1B are switched to an L level and an H level, respectively.

In such a case, when gate signals GC1 and GC2 are switched from gate signals GC1a and GC3a to gate signals GC1b and GC3b, respectively, immediately in response to switching of selection command signals SE1A and SE1B, switching element 53 may be brought into a conductive state even though switching element 51 is still in a conductive state. When switching elements 51 and 53 are simultaneously brought into conductive states, switching elements 51 and 53 may cause a short circuit across terminals of capacitor 55, so that an overcurrent may flow to thereby damage switching elements 51, 53 and the like.

On the other hand, in gate circuit 71, when selection command signals SE1A and SE1B are switched to an L level and an H level, respectively, output signal ϕ82 from one-shot pulse generator circuit 82 is set to an H level by prescribed time period Tc, gate signals GC1 and GC3 each are set to an L level by prescribed time period Tc, and then, switching elements 51 and 53 are brought into non-conductive states. Thus, switching elements 51 and 53 are prevented from being simultaneously brought into conductive states. Since each of gate circuits 72, 73, and 74 has the same configuration as that of gate circuit 71, the description thereof will not be repeated.

In the present embodiment, gate circuits 71 to 74 fix respective gate signals GC1 to GC4 at L levels by prescribed time period Tc when the levels of selection command signals SE1A and SE1B are switched. Thus, switching elements 51 and 53 (or switching elements 52 and 5ϕcan be prevented from being simultaneously brought into conductive states, but the PWM control of switching elements 51 to 54 is to be stopped by prescribed time period Tc.

Thus, when the levels of selection command signals SE1A and SE1B are switched at arbitrary timing, the PWM control of switching elements 51 to 54 is stopped by prescribed time period Tc, which may cause distortion in the waveform of AC current Iuv. However, in the present embodiment, the levels of selection command signals SE1A and SE1B are switched at the time when AC current Iuv flows through the zero cross point. Accordingly, the waveform distortion of AC current Iuv can be suppressed sufficiently small.

Referring back to FIG. 6, OR gate 75 outputs a logical OR signal of gate block signals GBa and GBb from respective controllers 7 and 8, as gate block signal GB, to drive circuit 62. OR gate 76 outputs a logical OR signal of gate deblock signals DEBa and DEBb from respective controllers 7 and 8, as gate deblock signal DEB, to drive circuit 62. OR gate 77 outputs a logical OR signal of conduction command signals SONa and SONb as conduction command signal SON to drive circuit 62.

The logical OR signal of gate signals GC1a and GC1b from respective controllers 7 and 8 cannot be set as gate signal GC1 for the reason as described below. Specifically, as shown in FIG. 8, when the phase of gate signal GC1a and the phase of gate signal GC1b shift from each other, the pulse width of gate signal GC1 increases, which prevents accurate PWM control.

The following is an explanation about the operation of power conversion device 100 shown in FIGS. 1 to 8. In the following, only the operation related to arm A1 will be described for the sake of simplification of explanation. In this case, it is assumed that controller 7 is selected using operation unit 6 (FIG. 1), and selection signal SE is set to an L level. Since selection signal SE is set at an L level, selection command signals SE1A and SE1B are set at an H level and an L level, respectively, by respective selection command units 11 and 21 (FIG. 2).

Control unit 10 (FIG. 2) generates control signal CNT1A for controlling arm A1 irrespective of the level of selection signal SE. Control unit 20 (FIG. 2) generates control signal CNT1B for controlling arm A1 irrespective of the level of selection signal SE. Control signals CNT1A, CNT1B and selection command signals SE1A, SE1B are provided to I/F circuit 61 (FIG. 5) included in each of unit converters 5 of arm A1.

Since selection command signals SE1A and SE1B are set at an H level and an L level, respectively, I/F circuit 61 causes control signal CNT1A to pass therethrough. Gate signals GC1a, GC2a, GC3a, and GC4a included in control signal CNT1A pass through I/F circuit 61, and turn into gate signals GC1, GC2, GC3, and GC4, respectively. Drive circuit 62 drives switching elements 51 to 54 according to gate signals GC1 to GC4.

Then, controller 8 is selected using operation unit 6 (FIG. 1), and selection signal SE is raised from an L level to an H level. In the state where selection signal SE is raised from an L level to an H level, when AC current Iuv flowing through arm A1 passes through the zero cross point, selection command unit 11 lowers selection command signal SE from an H level to an L level and selection command unit 21 raises selection command signal SE1B from an L level to an H level (time t2 in FIG. φ.

When selection command signals SE1A and SE1B are set to an L level and an H level, respectively, gate circuits 71, 72, 73, and 74 (FIG. 6) interrupt passage of respective gate signals GC1a, GC2a, GC3a, and GC4a and respective gate signals GC1b, GC2b, GC3b, and GC4b by prescribed time period Tc (FIG. 8), and thereafter, causes respective gate signals GC1b, GC2b, GC3b, and GC4b to pass therethrough. Gate signals GC1b, GC2b, GC3b, and GC4b having passed through respective gate circuits 71, 72, 73, and 74 are provided to drive circuit 62. Drive circuit 62 drives switching elements 51 to 54 according to gate signals GC1 to GC4.

As described above, in the present embodiment, in the case where the level of selection signal SE is switched, when the absolute value of AC current Iuv decreases below threshold current ITH, the levels of selection command signals SE1A and SE1B are switched so as to switch gate signals GC1 to GC4. Therefore, the waveform distortion of AC current Iuv that occurs at the time of switching of gate signals GC1 to GC4 can be suppressed small.

Figure 9:
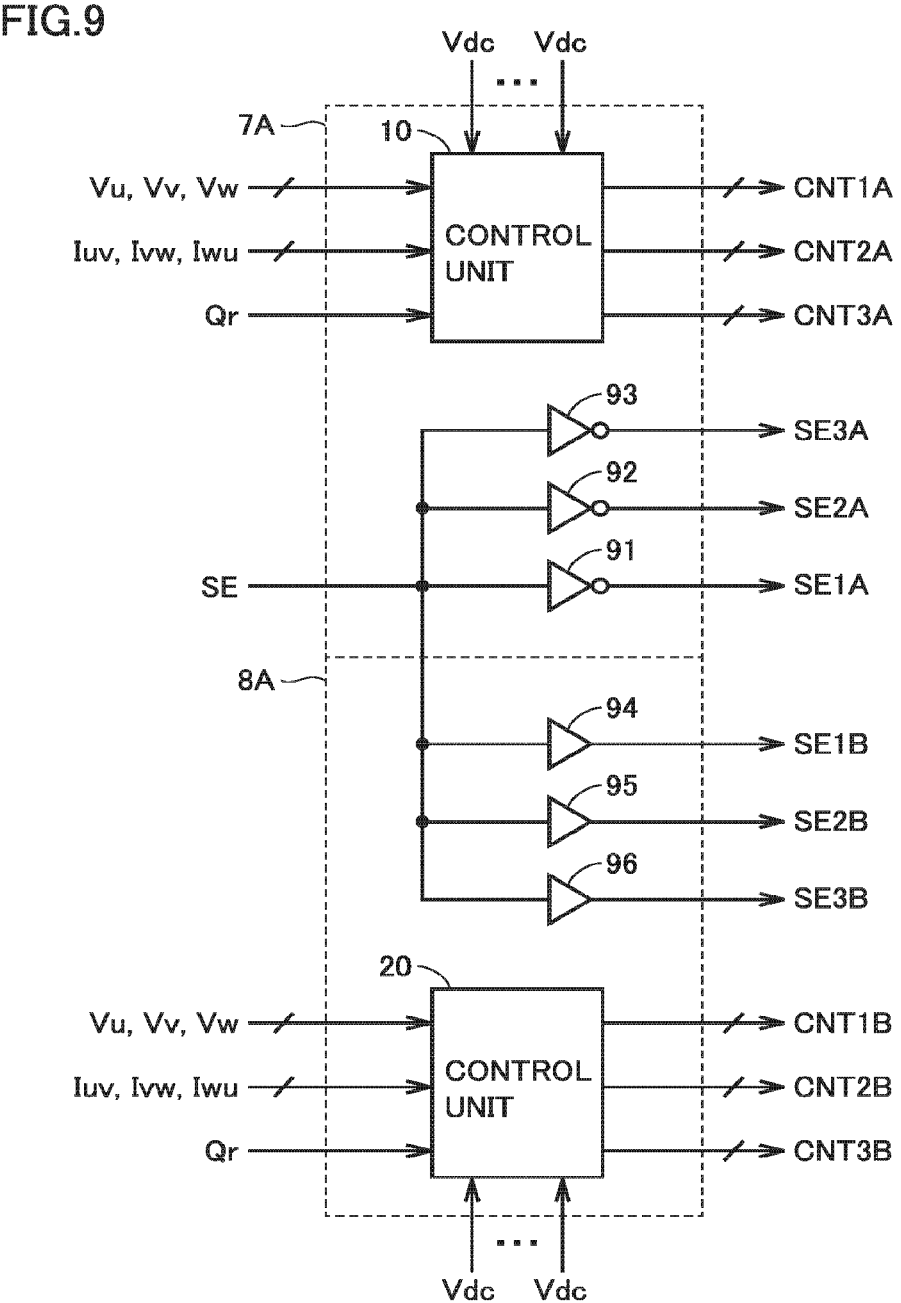
FIG. 9 is a circuit block diagram showing a comparative example of the embodiment.

FIG. 9 is a circuit block diagram showing a main part of a comparative example of the embodiment as compared with FIG. 2. Referring to FIG. 9, the present comparative example includes controllers 7A and 8A replaced with controllers 7 and 8, respectively, of power conversion device 100. Controller 7A includes inverters 91, 92 and 93 replaced with selection command units 11, 12 and 13, respectively, of controller 7. Controller 8A includes buffers 94, 95 and 96 replaced with selection command units 21, 22 and 23, respectively, of controller 8.

Selection signal SE is provided to each of inverters 91 to 93 and buffers 94 to 96. The output signals from inverters 91, 92 and 93 turn into selection command signals SE1A, SE2A and SE3A, respectively. The output signals from buffers 94, 95 and 96 turn into selection command signals SE1B, SE2B and SE3B, respectively.

FIG. 10 shows time charts for illustrating the problem of the comparative example shown in FIG. 9, as compared with FIG. 4. In FIG. 10, (A) shows waveforms of three-phase AC currents Iuv, Ivw, and Iwu; (B) shows a waveform of selection signal SE; (C), (D) and (E) show waveforms of selection command signals SE1A, SE2A, and SE3A, respectively; and (F), (G) and (H) show waveforms of selection command signals SE1B, SE2B and SE3B, respectively.

It is assumed that selection signal SE is set at an L level at time to. When selection signal SE is set at an L level, selection command signals SE1A, SE2A and SE3A each are set to an H level by inverters 91, 92 and 93, respectively, and selection command signals SE1B, SE2B and SE3B each are set to an L level by buffers 94, 95 and 96, respectively. In this case, gate signals GC1a, GC2a, GC3a, and GC4a from controller 7 pass through respective gate circuits 71, 72, 73, and 74 (FIG. 6) so as to be provided to drive circuit 62. Then, drive circuit 62 drives switching elements 51 to 54.

When selection signal SE is raised from an L level to an H level at time t1, selection command signals SE1A, SE2A and SE3A each are set to an L level by inverters 91, 92 and 93, respectively, and selection command signals SE1B, SE2B and SE3B each are set to an H level by buffers 94, 95 and 96, respectively. When the levels of selection command signals SE1A to SE3A and SE1B to SE3B are switched, gate circuits 71, 72, 73 and 74 (FIG. 6) interrupt respective gate signals GC1a, GC2a, GC3a, GC4a and respective gate signals GC1b, GC2b, GC3b, and GC4b by prescribed time period Tc. Thereafter, gate signals GC1b, GC2b, GC3b, and GC4b pass through respective gate circuits 71, 72, 73, and 74 so as to be provided to drive circuit 62. Then, drive circuit 62 drives switching elements 51 to 54.

In the present comparative example, when the level of selection signal SE is switched, then immediately, the levels of selection command signals SE1A, SE1B are switched so as to switch gate signals GC1 to GC4. Accordingly, as compared with the embodiment in which gate signals GC1 to GC4 are switched at the time when AC currents Iuv, Ivw, and Iwu pass through the zero cross point, the waveforms of AC currents Iuv, Ivw, and Iwu significantly distort as shown in FIG. 10(A).

It should be understood that the embodiments disclosed herein are illustrative and non-restrictive in every respect. The present invention is defined by the terms of the claims, rather than the description above, and is intended to include any modifications within the meaning and scope equivalent to the terms of the claims.

REFERENCE SIGNS LIST 1 electric power system, S1 to S7 switch, 2, 3 transformer, R1 to R3 current-limiting resistor, UL, VL, WL AC line, C1 to C3 current transformer, L1 to L3 reactor, A1 to A3 arm, 6 operation unit, 7, 8 controller 10, 20 control unit, 11 to 13, 21 to 23 selection command unit, 31, 41 absolute value detector, 32, 42 comparator, 33, 91 to 93 inverter, 34, 43, 83, 84 AND gate, 35, 44 flip-flop, 50 main circuit, 51 to 54 switching element, D1 to D4 diode, 55 capacitor, 60 control circuit, 61 I/F circuit, 62 drive circuit, 63 switch operation circuit, 64 current-limiting resistance circuit, 65 power supply, 71 to 74 gate circuit, 75 to 77, 85 OR gate, 81, 82 one-shot pulse generator circuit, 94 to 96 buffer, 100 power conversion device.

The invention claimed is:
1. A power conversion device comprising:
a capacitor;
a power converter that transmits and receives electric power between the capacitor and an AC power supply;
a current detector that detects an instantaneous value of an AC current that flows between the AC power supply and the power converter;
a first controller and a second controller that control the power converter;
a selector that set a selection signal to a first level when the first controller is selected by an operation of a user and set the selection signal to a second level when the second controller is selected by the operation of the user;
a gate circuit; and
a drive circuit;
wherein the first controller includes:
a first selection command unit that activates or deactivates a first selection command signal based on a level of the selection signal; and
a first control unit that generates a first control signal;
the second controller includes:

a second selection command unit that activates or deactivates a second selection command signal based on the level of the selection signal; and a second control unit that generates a second control signal;

the gate circuit causes the first control signal to pass through the gate circuit when the first selection command signal is activated and the second selection signal is deactivated and causes the second control signal to pass through the gate circuit when the first selection command signal is deactivated and the second selection signal is activated;

the drive circuit drives the power converter based on the first control signal or the second control signal that passes through the gate circuit;

the first selection command unit and the second selection command unit change the first selection command signal from an activated state to a deactivated state and change the second selection command signal from a deactivated state to an activated state when the selection signal changes from the first level to the second level and when an absolute value of the instantaneous value of the AC current detected by the current detector decreases below a predetermined value, the first selection command unit and the second selection command unit change the first selection command signal from a deactivated state to an activated state and change the second selection command signal from an activated state to a deactivated state when the selection signal changes from the second level to the first level and when an absolute value of the instantaneous value of the AC current detected by the current detector decreases below a predetermined value.

2. The power conversion device according to claim 1, wherein the gate circuit includes:

a first one-shot pulse generator circuit that outputs a first one-shot pulse when the first selection command signal changes from a deactivated state to an activated state;

a first logic circuit receives the first selection command signal, the first control signal, and the first one-shot pulse;

a second one-shot pulse generator circuit that outputs a second one-shot pulse when the second selection command signal changes from a deactivated state to an activated state;

a second logic circuit receives the second selection command signal, the second control signal, and the second one-shot pulse; and a third logic circuit outputs a logical sum of an output of the first logic circuit and an output of the second logic circuit.

* * * * *